(12) United States Patent
Aotani et al.

(10) Patent No.: US 12,391,254 B2
(45) Date of Patent: Aug. 19, 2025

(54) VEHICLE CONTROLLER, METHOD, AND COMPUTER PROGRAM FOR VEHICLE CONTROL

(71) Applicant: TOYOTA JIDOSHA KABUSHIKI KAISHA, Toyota (JP)

(72) Inventors: Yoshihiro Aotani, Kawasaki (JP); Eiki Kitagawa, Edogawa-ku Tokyo-to (JP); Satoru Akahane, Shinjuku-ku Tokyo-to (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 121 days.

(21) Appl. No.: 18/228,826

(22) Filed: Aug. 1, 2023

(65) Prior Publication Data

US 2024/0051540 A1 Feb. 15, 2024

(30) Foreign Application Priority Data

Aug. 9, 2022 (JP) .................................. 2022-127313

(51) Int. Cl.
 *B60W 30/18* (2012.01)
 *B60W 40/04* (2006.01)
 *B60W 60/00* (2020.01)

(52) U.S. Cl.
 CPC ...... *B60W 30/18163* (2013.01); *B60W 40/04* (2013.01); *B60W 60/001* (2020.02); *B60W 2720/106* (2013.01)

(58) Field of Classification Search
 CPC ........... B60W 30/18163; B60W 40/04; B60W 60/001; B60W 2720/106;

(Continued)

(56) References Cited

U.S. PATENT DOCUMENTS 6,708,099 B2 * 3/2004 Tellis ..................... B60W 30/16
 701/96
8,165,776 B2 * 4/2012 Sugawara ............. B60W 30/12
 340/436

(Continued)

FOREIGN PATENT DOCUMENTS

JP 2009-078735 A 4/2009
JP 2013-177054 A 9/2013

(Continued)

OTHER PUBLICATIONS

JP-2020015345-A machine translation (Year: 2020).*
JP-2022056602-A machine translation (Year: 2022).*
JP-2019192233-A machine translation (Year: 2019).*

*Primary Examiner* — Angelina M Shudy
(74) *Attorney, Agent, or Firm* — Dinsmore & Shohl LLP (57) ABSTRACT

A vehicle controller includes a processor configured to detect, ahead of a host vehicle, a merging section in which an adjacent lane adjacent to a host vehicle lane being traveled by the host vehicle merges into the host vehicle lane, detect one or more other vehicles traveling on the adjacent lane, determine whether to allow at least one of the detected vehicles to precede the host vehicle at a lane change of the one of the detected vehicles to the host vehicle lane in the merging section, and control acceleration or deceleration of the host vehicle so that a rear end of the host vehicle is ahead of a front end of a second vehicle following a first vehicle allowed to precede the host vehicle. The first and second vehicles are among the detected vehicles.

5 Claims, 5 Drawing Sheets

(58) Field of Classification Search
CPC .......... B60W 2554/802; B60W 30/143; G08G 1/00; G05D 1/00; G01C 21/00
See application file for complete search history.

(56) References Cited

U.S. PATENT DOCUMENTS

| | | | | |
|---|---|---|---|---|
| 8,788,134 B1* | 7/2014 | Litkouhi | ............... | B60W 30/16 701/23 |
| 9,002,614 B2* | 4/2015 | Tominaga | ......... | B60W 50/0097 701/96 |
| 10,884,410 B2* | 1/2021 | Wiesenberg | ............. | B60Q 9/00 |
| 10,906,558 B1* | 2/2021 | Hwang | ............. | B60W 60/0027 |
| 11,465,626 B2* | 10/2022 | Wang | ..................... | G02B 27/01 |
| 11,807,239 B2* | 11/2023 | Eigel | ................. | B60W 60/0027 |
| 11,987,237 B2* | 5/2024 | Abad | ................ | B60W 60/0053 |
| 2003/0135318 A1* | 7/2003 | Tellis | ........................ | B60T 7/22 340/436 |
| 2006/0009910 A1* | 1/2006 | Ewerhart | ............ | B60W 30/143 701/96 |
| 2007/0150196 A1* | 6/2007 | Grimm | ..................... | B60T 7/22 348/148 |
| 2009/0088925 A1* | 4/2009 | Sugawara | ............. | B60W 30/12 340/436 |
| 2013/0060443 A1* | 3/2013 | Shida | ................ | B60K 31/0058 701/1 |
| 2013/0124012 A1* | 5/2013 | Shida | ........................ | G08G 1/08 701/2 |
| 2013/0226433 A1* | 8/2013 | Tominaga | ......... | B60W 50/0097 701/96 |
| 2014/0195093 A1* | 7/2014 | Litkouhi | ......... | B60W 30/18163 701/23 |
| 2015/0100216 A1* | 4/2015 | Rayes | .................. | G01S 13/867 701/96 |
| 2015/0166062 A1* | 6/2015 | Johnson | ................ | G08G 1/167 701/41 |
| 2016/0103212 A1* | 4/2016 | Nath | ....................... | G01S 13/04 342/28 |
| 2016/0272204 A1* | 9/2016 | Takahashi | ........... | B60W 30/165 |
| 2017/0076607 A1* | 3/2017 | Linder | .............. | B60W 30/0956 |
| 2018/0037227 A1* | 2/2018 | D'sa | ..................... | B60W 30/16 |
| 2018/0057002 A1* | 3/2018 | Lee | ................... | B60W 60/0015 |
| 2018/0215387 A1* | 8/2018 | Takae | ..................... | B60K 31/00 |
| 2019/0139415 A1* | 5/2019 | Sakaguchi | ............ | B60W 30/10 |
| 2019/0367026 A1* | 12/2019 | Hattori | ................. | G05D 1/0044 |
| 2019/0382021 A1* | 12/2019 | Niibo | .................. | B60W 10/184 |
| 2020/0079377 A1* | 3/2020 | Yashiro | ................. | B60W 50/14 |
| 2020/0098266 A1* | 3/2020 | Tanaka | ............... | B60W 60/001 |
| 2020/0189598 A1* | 6/2020 | Eigel | ..................... | B60W 10/20 |
| 2020/0193833 A1* | 6/2020 | Matsunaga | .......... | G05D 1/0212 |
| 2020/0307600 A1* | 10/2020 | Sato | ........................ | G08G 1/167 |
| 2021/0192956 A1* | 6/2021 | Takeda | .................. | G08G 1/167 |
| 2022/0114895 A1* | 4/2022 | Avedisov | ............. | G08G 1/0112 |
| 2022/0194372 A1* | 6/2022 | Kitajima | ............ | B60W 30/143 |
| 2022/0289194 A1* | 9/2022 | Lee | ..................... | B60W 30/165 |
| 2022/0371595 A1* | 11/2022 | Meuresch | .................. | G08G 1/167 |
| 2023/0154333 A1* | 5/2023 | Morimoto | .............. | G08G 1/167 701/119 |
| 2023/0306851 A1* | 9/2023 | Mizoguchi | .......... | B60W 40/105 |
| 2024/0051536 A1* | 2/2024 | Aotani | ............ | B60W 30/18163 |
| 2024/0059288 A1* | 2/2024 | Nakatsuru | ........... | B60W 30/162 |
| 2024/0067165 A1* | 2/2024 | Kuroda | ................ | B60W 30/143 |
| 2024/0190434 A1* | 6/2024 | Zeiynali Farid | ...... | B60W 30/16 |
| 2024/0239345 A1* | 7/2024 | Uno | ................ | B60W 30/18163 |
| 2024/0253632 A1* | 8/2024 | Kamatani | ........... | B60W 30/182 |
| 2024/0270237 A1* | 8/2024 | Yoda | .................. | B60W 30/14 |
| 2024/0308507 A1* | 9/2024 | Kueperkoch | ... | B60W 30/18163 |
| 2025/0002016 A1* | 1/2025 | Emoto | .................. | B60W 30/16 |
| 2025/0130567 A1* | 4/2025 | Goldman-Shenhar | ...... | G06F 16/9024 |

FOREIGN PATENT DOCUMENTS

| | | | | |
|---|---|---|---|---|
| JP | 2017-087923 A | | 5/2017 | |
| JP | 6337435 B2 | | 6/2018 | |
| JP | 2019-067057 A | | 4/2019 | |
| JP | 2019192233 A | * | 10/2019 | ........ B60W 30/0956 |
| JP | 2020015345 A | * | 1/2020 | |
| JP | 2022056602 A | * | 4/2022 | |

* cited by examiner

VEHICLE CONTROLLER, METHOD, AND COMPUTER PROGRAM FOR VEHICLE CONTROL

CROSS-REFERENCE TO RELATED APPLICATION

This application claims priority to Japanese Patent Application No. 2022-127313 filed on Aug. 9, 2022, the entire contents of which are herein incorporated by reference.

FIELD

The present disclosure relates to a vehicle controller, a method, and a computer program for vehicle control.

BACKGROUND

Techniques to adjust the distance between vehicles in autonomous driving of a vehicle or driving support to a vehicle driver on the assumption that another vehicle will cut into a lane being traveled by the vehicle from an adjacent lane have been proposed (see Japanese Unexamined Patent Publications JP2017-87923A and JP2013-177054A).

A driving support device disclosed in JP2017-87923A determines whether a host vehicle lane being traveled by a host vehicle adjoins a merging lane or a reduced lane, when merging or reduction in the number of lanes is detected ahead of the host vehicle. The device increases a preset distance between vehicles only in the case where the host vehicle lane adjoins such a merging lane or a reduced lane and where, on the merging lane or the reduced lane, a vehicle slower than the host vehicle is detected at least a predetermined distance ahead of the host vehicle or a vehicle faster than the host vehicle is detected between a position within the predetermined distance and a position moving with the host vehicle.

A controller of distance between vehicles disclosed in JP2013-177054A determines whether the location of detection is a merging point, when another vehicle is detected beside a host vehicle. When the location is a merging point, the controller executes control to yield right-of-way, assuming that the detected vehicle will probably cut in, and increases the distance between vehicles while cutting in is not finished. When a following vehicle that tries to cut in front of the host vehicle is further detected beside the host vehicle, the controller reduces the distance between vehicles; when such a following vehicle is not detected, the controller resets the distance between vehicles.

SUMMARY

When multiple other vehicles are traveling on an adjacent lane merging with a host vehicle lane, control of a host vehicle to yield to a first vehicle traveling ahead among the multiple other vehicles may result in the host vehicle traveling side by side with a second vehicle following the first vehicle. In such a case, the host vehicle may obstruct a lane change of the second vehicle to the host vehicle lane, or make the driver of the second vehicle mistakenly believe that the host vehicle also yields to the second vehicle. In particular, if the driver of the second vehicle mistakenly believes that right-of-way is yielded, the second vehicle tries to cut in front of the host vehicle, which may cause danger. Additionally, in terms of collision avoidance, it is not desirable that the host vehicle detects the second vehicle trying to cut in front of the host vehicle and then reduces the distance between vehicles, as in the technique disclosed in JP2013-177054A.

It is an object of the present disclosure to provide a vehicle controller that can appropriately adjust the positional relationship between a host vehicle and another vehicle traveling on an adjacent lane merging with a lane being traveled by the host vehicle.

According to an embodiment, a vehicle controller is provided. The vehicle controller includes a processor configured to: detect, ahead of a host vehicle, a merging section in which an adjacent lane adjacent to a host vehicle lane being traveled by the host vehicle merges into the host vehicle lane, detect one or more other vehicles traveling on the adjacent lane, determine whether to allow at least one of the detected vehicles to precede the host vehicle at a lane change of the one of the detected vehicles to the host vehicle lane in the merging section, and control acceleration or deceleration of the host vehicle so that a rear end of the host vehicle is ahead of a front end of a second vehicle following a first vehicle allowed to precede the host vehicle, the first and second vehicles being among the detected vehicles.

In some embodiments, the processor of the vehicle controller controls acceleration or deceleration of the host vehicle so that space between the host vehicle and the first vehicle is smaller than space between the host vehicle and the second vehicle.

Alternatively, in some embodiments, the processor controls acceleration or deceleration of the host vehicle, depending on space between the first vehicle and the second vehicle, so that the ratio of space between the host vehicle and the first vehicle to space between the host vehicle and the second vehicle is constant.

According to another embodiment, a method for vehicle control is provided. The method includes detecting, ahead of a host vehicle, a merging section in which an adjacent lane adjacent to a host vehicle lane being traveled by the host vehicle merges into the host vehicle lane; detecting one or more other vehicles traveling on the adjacent lane; determining whether to allow at least one of the detected vehicles to precede the host vehicle at a lane change of the one of the detected vehicles to the host vehicle lane in the merging section; and controlling acceleration or deceleration of the host vehicle so that a rear end of the host vehicle is ahead of a front end of a second vehicle following a first vehicle allowed to precede the host vehicle, the first and second vehicles being among the detected vehicles.

According to still another embodiment, a non-transitory recording medium that stores a computer program for vehicle control is provided. The computer program includes instructions causing a processor mounted on a host vehicle to execute a process including detecting, ahead of the host vehicle, a merging section in which an adjacent lane adjacent to a host vehicle lane being traveled by the host vehicle merges into the host vehicle lane; detecting one or more other vehicles traveling on the adjacent lane; determining whether to allow at least one of the detected vehicles to precede the host vehicle at a lane change of the one of the detected vehicles to the host vehicle lane in the merging section; and controlling acceleration or deceleration of the host vehicle so that a rear end of the host vehicle is ahead of a front end of a second vehicle following a first vehicle allowed to precede the host vehicle, the first and second vehicles being among the detected vehicles.

The vehicle controller according to the present disclosure has an advantageous effect of being able to appropriately adjust the positional relationship between the host vehicle and another vehicle traveling on an adjacent lane merging with a lane being traveled by the host vehicle.

DESCRIPTION OF EMBODIMENTS

A vehicle controller, a method for vehicle control executed by the vehicle controller, and a computer program for vehicle control will now be described with reference to the attached drawings. In a merging section where an adjacent lane which is adjacent to a host vehicle lane being traveled by a host vehicle merges into the host vehicle lane, the vehicle controller adjusts the positional relationship between another vehicle traveling on the adjacent lane and the host vehicle. More specifically, the vehicle controller determines whether to allow one or more other vehicles traveling in the merging section to precede the host vehicle, and controls acceleration or deceleration of the host vehicle so that a rear end of the host vehicle is ahead of a front end of a second vehicle following a first vehicle that is the rearmost of the other vehicles allowed to precede the host vehicle. In this way, the vehicle controller prevents obstructing a lane change to the host vehicle lane of another vehicle traveling in the merging section to which the host vehicle does not intend to yield right-of-way, and prevents making the driver of the other vehicle mistakenly believe that right-of-way is yielded.

Figure 1:
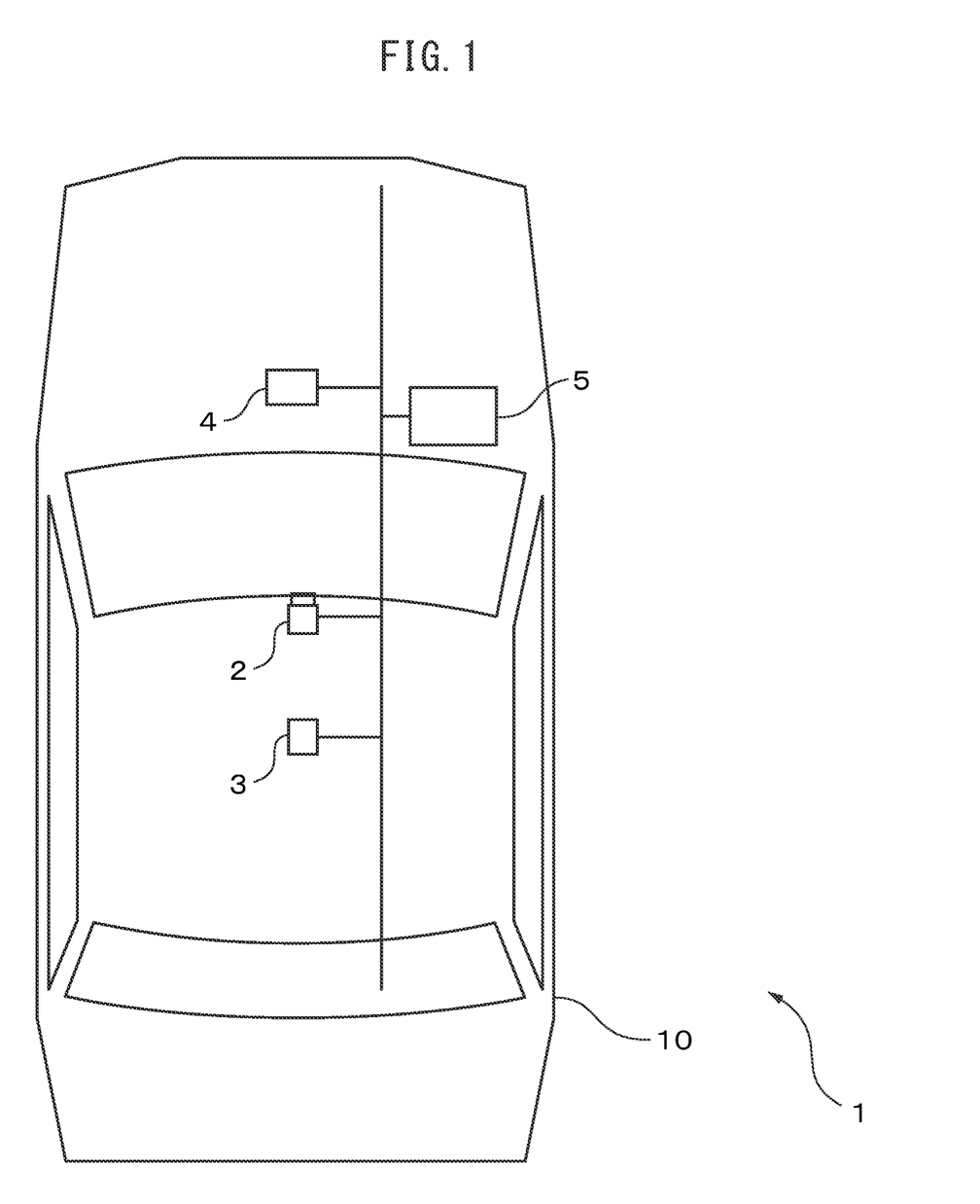
FIG. 1 schematically illustrates the configuration of a vehicle control system equipped with a vehicle controller.
Figure 2:
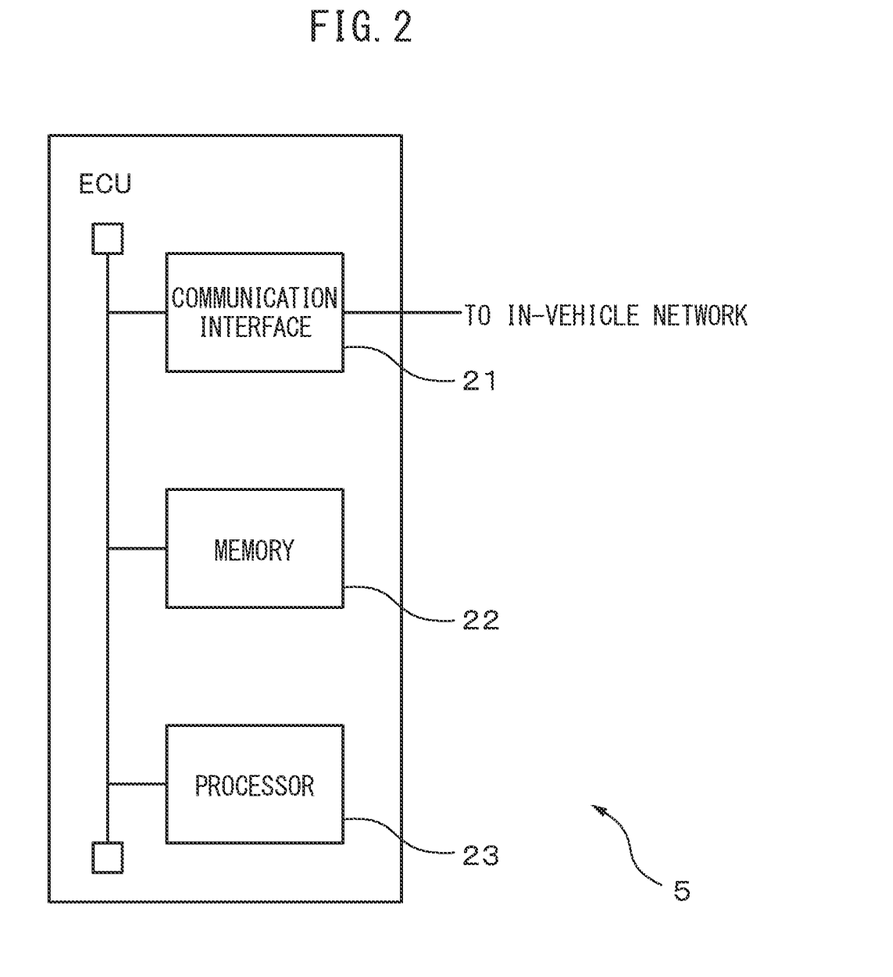
FIG. 2 illustrates the hardware configuration of an electronic control unit, which is an embodiment of the vehicle controller.

FIG. 1 schematically illustrates the configuration of a vehicle control system equipped with the vehicle controller. FIG. 2 illustrates the hardware configuration of an electronic control unit, which is an embodiment of the vehicle controller. In the present embodiment, the vehicle control system 1 is mounted on a vehicle 10, which is an example of the host vehicle, and controls the vehicle 10. The vehicle control system 1 includes a camera 2, a GPS receiver 3, a storage device 4, and an electronic control unit (ECU) 5, which is an example of the vehicle controller. The camera 2, the GPS receiver 3, and the storage device 4 are communicably connected to the ECU 5 via an in-vehicle network conforming to a standard such as a controller area network. The vehicle control system 1 may further include a range sensor (not illustrated) that measures the distances from the vehicle 10 to objects around the vehicle 10, such as LiDAR or radar; a wireless communication terminal (not illustrated) for communicating with another device; and a navigation device (not illustrated) for setting a planned travel route of the vehicle 10.

The camera 2, which is an example of a sensor for detecting the situation around the vehicle 10, includes a two-dimensional detector constructed from an array of optoelectronic transducers, such as CCD or C-MOS, having sensitivity to visible light and a focusing optical system that forms an image of a target region on the two-dimensional detector. The camera 2 is mounted, for example, in the interior of the vehicle 10 so as to be oriented, for example, to the front of the vehicle 10. The camera 2 takes pictures of a region in front of the vehicle 10 every predetermined capturing period (e.g., 1/30 to 1/10 seconds), and generates images representing the region. Each image obtained by the camera 2 is an example of a sensor signal. The vehicle 10 may include multiple cameras taking pictures in different orientations or having different focal lengths. For example, the vehicle 10 may include cameras for taking pictures of regions in front of the vehicle 10 and behind the vehicle 10. In some embodiment, the vehicle 10 includes one or more cameras 2 (and range sensors) so that all the surroundings of the vehicle 10 can be detected with the cameras 2 or with the cameras 2 and the range sensors.

Every time an image is generated, the camera 2 outputs the generated image to the ECU 5 via the in-vehicle network.

The GPS receiver 3 receives GPS signals from GPS satellites at predetermined intervals, and determines the position of the vehicle 10, based on the received GPS signals. The GPS receiver 3 outputs positioning information indicating the result of determination of the position of the vehicle 10 based on the GPS signals to the ECU 5 via the in-vehicle network at predetermined intervals. Instead of the GPS receiver, the vehicle 10 may include a receiver that receives positioning signals from satellites of another satellite positioning system to determine the position of the vehicle 10.

The storage device 4, which is an example of a storage unit, includes, for example, a hard disk drive, a nonvolatile semiconductor memory, or an optical medium and an access device therefor. The storage device 4 stores a high-precision map, which is an example of map information. The high-precision map includes information indicating merging sections included in a predetermined region represented in the high-precision map. The high-precision map further includes the number and width of lanes of each road section and features on or around each road section. Examples of features represented in a high-precision map include road markings such as lane-dividing lines, various traffic signs, and structures such as curbstones, guardrails, and poles.

The storage device 4 may further include a processor for executing, for example, a process to update a high-precision map and a process related to a request from the ECU 5 to read out a high-precision map. For example, every time the vehicle 10 moves a predetermined distance, the storage device 4 may transmit a request to obtain a high-precision map, together with the current position of the vehicle 10, to a map server via the wireless communication terminal (not illustrated). The storage device 4 may receive a high-precision map of a predetermined region around the current position of the vehicle 10 from the map server via the wireless communication terminal. Upon receiving a request from the ECU 5 to read out a high-precision map, the storage device 4 cuts out that portion of a high-precision map stored therein which includes the current position of the vehicle 10 and which represents a region smaller than the predetermined region, and outputs the cutout portion to the ECU 5 via the in-vehicle network.

The ECU 5 executes autonomous driving control of the vehicle 10 or driving support to the driver of the vehicle 10. In particular, the ECU 5 controls acceleration or deceleration of the vehicle 10 during travel of the vehicle 10 in a merging section so as to automatically adjust the positional relationship between the vehicle 10 and another vehicle traveling in an area around the vehicle 10.

As illustrated in FIG. 2, the ECU 5 includes a communication interface 21, a memory 22, and a processor 23. The communication interface 21, the memory 22, and the processor 23 may be configured as separate circuits or a single integrated circuit.

The communication interface 21 includes an interface circuit for connecting the ECU 5 to the in-vehicle network. Every time an image is received from the camera 2, the communication interface 21 passes the received image to the processor 23. Every time positioning information is received from the GPS receiver 3, the communication interface 21 passes the positioning information to the processor 23. In addition, the communication interface 21 passes a high-precision map read from the storage device 4 to the processor 23. Further, the communication interface 21 passes various types of information received by the wireless communication terminal (not illustrated) from another device and ranging signals received from the range sensor (not illustrated) to the processor 23.

The memory 22, which is another example of a storage unit, includes, for example, volatile and nonvolatile semiconductor memories, and stores various types of data used in a vehicle control process executed by the processor 23. For example, the memory 22 stores parameters of the camera 2 such as the focal length, the orientation, and the mounted position as well as various parameters for specifying a classifier used for detecting objects around the vehicle 10. The memory 22 further stores positioning information, images of the surroundings of the vehicle 10, ranging signals, and a high-precision map. Further, the memory 22 temporarily stores various types of data generated during the vehicle control process.

The processor 23 includes one or more central processing units (CPUs) and a peripheral circuit thereof. The processor 23 may further include another operating circuit, such as a logic-arithmetic unit, an arithmetic unit, or a graphics processing unit. The processor 23 executes the vehicle control process on the vehicle 10 at predetermined intervals.

Figure 3:
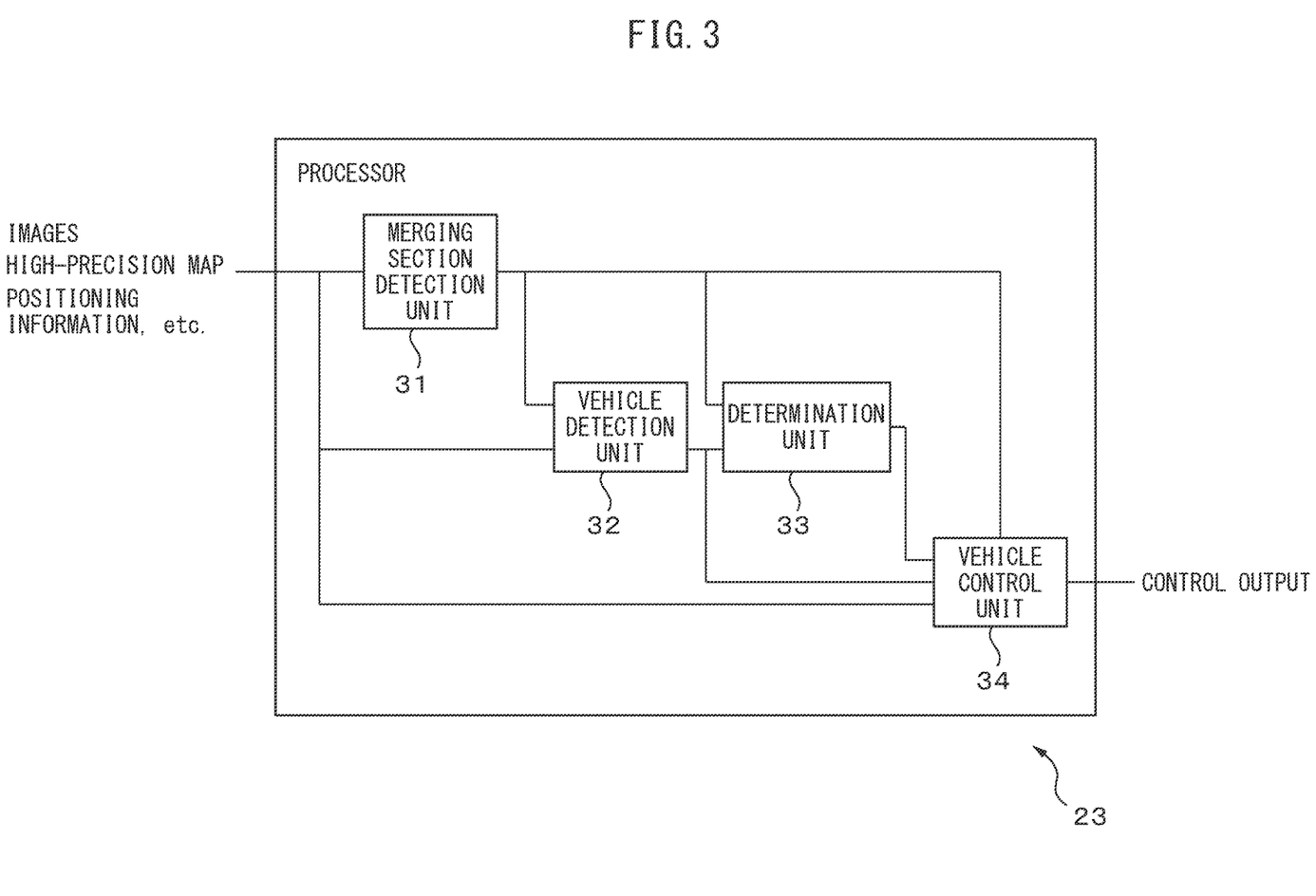
FIG. 3 is a functional block diagram of a processor of the electronic control unit, related to a vehicle control process.

FIG. 3 is a functional block diagram of the processor 23, related to the vehicle control process. The processor 23 includes a merging section detection unit 31, a vehicle detection unit 32, a determination unit 33, and a vehicle control unit 34. These units included in the processor 23 are functional modules, for example, implemented by a computer program executed by the processor 23, or may be dedicated operating circuits provided in the processor 23.

The merging section detection unit 31 detects, ahead of the vehicle 10, a merging section in which an adjacent lane adjacent to a host vehicle lane being traveled by the vehicle 10 merges into the host vehicle lane. Such a merging section may be, for example, a section in which a lane, for example, from an interchange merges with a main lane of an expressway, which is a host vehicle lane (the former lane will be referred to simply as a "merging lane" below), i.e., a section in which a lane change can be made from a merging lane to a main lane. Alternatively, a merging section may be a subsection having a predetermined length (e.g., several dozen to several hundred meters) and extending to an endpoint beyond which vehicles cannot travel on a lane adjacent to a host vehicle lane, in a road section where the number of lanes decreases because of the structure of the road or traffic restrictions, for example, caused by roadwork. In this case, the adjacent lane on which vehicles cannot travel beyond the endpoint is a merging lane merging with the host vehicle lane.

First, the merging section detection unit 31 detects a host vehicle lane being traveled by the vehicle 10. For example, the merging section detection unit 31 refers to the current position of the vehicle 10 indicated by the latest positioning information and a high-precision map to detect a lane including the current position of the vehicle 10 among individual lanes of a road section represented in the high-precision map as a host vehicle lane. Alternatively, the merging section detection unit 31 may compare the latest image obtained by the camera 2 with a high-precision map to detect a host vehicle lane. In this case, the merging section detection unit 31 detects individual features around the vehicle 10 from the image, and projects the detected individual features onto the high-precision map, assuming the position and orientation of the vehicle 10. The merging section detection unit 31 then calculates the degree of matching between the individual features detected from the image and corresponding features represented in the high-precision map (e.g., the sum of squares of the distances between the detected individual features and the corresponding features in the high-precision map or its inverse). While variously changing the assumed position and orientation of the vehicle 10, the merging section detection unit 31 identifies the position and orientation of the vehicle 10 for the case where the detected individual features match the corresponding features represented in the high-precision map the best. The merging section detection unit 31 then estimates the current position and orientation of the vehicle 10 to be the position and orientation of the vehicle 10 for the case where the detected individual features match the corresponding features represented in the high-precision map the best. The merging section detection unit 31 identifies a lane including the current position of the vehicle 10 as a host vehicle lane being traveled by the vehicle 10, by referring to the high-precision map.

To detect features represented in an image, the merging section detection unit 31 inputs the image into a classifier that has been trained to detect a feature. As such a classifier, the merging section detection unit 31 can use a deep neural network (DNN) having architecture of a convolutional neural network (CNN) type, such as Single Shot MultiBox Detector (SSD) or Faster R-CNN. Alternatively, as such a classifier, the merging section detection unit 31 may use a DNN having architecture of a self-attention network (SAN) type, such as Vision Transformer. Such a classifier is trained in advance with a large number of training images representing features to be detected, in accordance with a predetermined training technique, such as backpropagation.

Upon identification of a host vehicle lane, the merging section detection unit 31 determines whether an adjacent lane merges into the host vehicle lane in a section from the current position of the vehicle 10 to a predetermined distance away along the travel direction of the vehicle 10, by referring to the current position of the vehicle 10 indicated by the latest positioning information and a high-precision map. When such an adjacent lane exists, the merging section detection unit 31 detects a section in which a lane change can be made from the adjacent lane to the host vehicle lane, as a merging section.

Alternatively, the merging section detection unit 31 determines whether traffic information received via the wireless communication terminal (not illustrated) indicates that traffic restrictions prohibiting travel on an adjacent lane are imposed on a section from the current position of the vehicle 10 to a predetermined distance away. When such traffic restrictions are indicated, the merging section detection unit 31 detects a predetermined length of section that ends at the location of the traffic restrictions, as a merging section. Alternatively, the merging section detection unit 31 may detect a signboard indicating that travel on a lane adjacent to the host vehicle lane is restricted or a sign indicating that an adjacent lane merges into the host vehicle lane, from an image obtained by the camera 2. When such a signboard is detected, the merging section detection unit 31 may detect a predetermined length of section that ends at the location of the traffic restrictions indicated by the signboard, as a merging section. Similarly, when such a sign is detected, the merging section detection unit 31 may detect a section indicated by the sign in which a lane change can be made from the adjacent lane to the host vehicle lane, as a merging section. The merging section detection unit 31 can detect such a signboard or a sign by inputting an image into a classifier that has been trained to detect a signboard or a sign. As such a classifier, the merging section detection unit 31 can use a classifier similar to the classifier for feature detection described in relation to detection of the host vehicle lane. Alternatively, the classifier for feature detection, which is used for detecting the host vehicle lane, may be trained in advance to detect a signboard or a sign too.

The merging section detection unit 31 notifies information indicating the position and length of the detected merging section to the vehicle detection unit 32, the determination unit 33, and the vehicle control unit 34.

The vehicle detection unit 32 detects one or more other vehicles traveling on the lane adjacent to the host vehicle lane in the merging section. The vehicle detection unit 32 may further detect another vehicle traveling on the adjacent lane in a predetermined section nearer to the host vehicle than the merging section. The predetermined section may be, for example, a section of several dozen meters in length that ends at the start point of the merging section.

The vehicle detection unit 32 detects another vehicle, for example, by inputting an image generated by the camera 2 whose capture area includes the merging section and the predetermined section into a classifier that has been trained to detect a vehicle. As such a classifier, the vehicle detection unit 32 can use a classifier similar to the classifier for feature detection described in relation to detection of the host vehicle lane. In the case where the vehicle 10 is equipped with multiple cameras 2, the vehicle detection unit 32 may identify a camera 2 whose capture area includes the merging section and the predetermined section, based on the detected merging section and the current position of the vehicle 10. The vehicle detection unit 32 then detects another vehicle traveling in the merging section or the predetermined section from an image generated by the identified camera 2. Since positions in an image correspond one-to-one to directions viewed from the camera 2, the vehicle detection unit 32 determines that the detected vehicle in an image is traveling in the merging section or the predetermined section, when the direction corresponding to a reference point in the region representing the detected vehicle is within the area of the merging section or the predetermined section viewed from the current position of the vehicle 10.

In the case where the vehicle 10 is equipped with one or more range sensors (not illustrated), the vehicle detection unit 32 may detect another vehicle, based on a ranging signal generated by a range sensor whose measurement area includes the merging section and the predetermined section. In this case also, the vehicle detection unit 32 detects another vehicle by inputting a ranging signal into a classifier that has been trained to detect a vehicle from a ranging signal. As such a classifier, the vehicle detection unit 32 can use a DNN having architecture of a CNN or SAN type, as in detection of a vehicle from an image.

The vehicle detection unit 32 may further detect another vehicle traveling on the host vehicle lane ahead of the vehicle 10 as a vehicle ahead by inputting an image generated by the camera 2 that takes pictures of a region in front of the vehicle 10 or a ranging signal generated by the range sensor into the classifier. Specifically, the vehicle detection unit 32 determines the detected vehicle whose position in the image or the ranging signal is within a predetermined area corresponding to the region in front of the vehicle 10, as a vehicle ahead. Alternatively, the vehicle detection unit 32 may further detect lane-dividing lines from the image, and detect a region sandwiched between the lane-dividing lines nearest to the vehicle 10 on the left and right of the vehicle 10 of the detected lane-dividing lines, as the host vehicle lane. The vehicle detection unit 32 may then determine the detected vehicle represented in a region in the image whose bottom overlaps the region representing the host vehicle lane in the image to a predetermined degree or more, as a vehicle ahead.

Every time another vehicle is detected on the adjacent lane, the vehicle detection unit 32 notifies the determination unit 33 and the vehicle control unit 34 of the position at which the detected vehicle is represented in the image or the ranging signal. Similarly, every time a vehicle ahead is detected on the host vehicle lane, the vehicle detection unit 32 notifies the determination unit 33 and the vehicle control unit 34 of the position at which the detected vehicle ahead is represented in the image or the ranging signal.

The determination unit 33 determines whether to allow the detected vehicle (hereafter the "target vehicle") to precede the vehicle 10 at a lane change of the target vehicle to the host vehicle lane in the merging section, when the vehicle 10 reaches a predetermined position nearer to the host vehicle than the merging section. The predetermined position may be, for example, a position that is a predetermined distance nearer to the current position of the vehicle 10 than the start position or the end position of the merging section. In some embodiments, when the predetermined position is set with respect to the end position of the merging section, the predetermined distance is set longer than the merging section.

The determination unit 33 determines whether to allow the target vehicle to precede the vehicle 10, based on the relative speed and the positional relationship between the target vehicle and the vehicle 10. More specifically, when (i) the target vehicle precedes the vehicle 10 before reaching a reference position and is faster than the vehicle 10, the determination unit 33 determines to allow the target vehicle to precede the vehicle 10. In other words, the determination unit 33 determines to yield to the target vehicle. Conversely, when (ii) the vehicle 10 precedes the target vehicle at a reference position and is faster than the target vehicle, the determination unit 33 determines to allow the vehicle 10 to precede the target vehicle. In other words, the determination unit 33 determines not to yield to the target vehicle. The reference position may be, for example, a position nearer to the host vehicle than the end position of the merging section by a minimum distance required for a target vehicle to make a lane change from an adjacent lane to the host vehicle lane or the minimum distance plus a predetermined offset distance.

When neither (i) nor (ii) above is satisfied (e.g., when the target vehicle precedes the vehicle 10 at the reference position and the vehicle 10 is faster than the target vehicle), the determination unit 33 determines to control the speed of the vehicle 10 to maintain the status quo.

The determination unit 33 refers to the current speeds and acceleration of the vehicle 10 and the target vehicle, the relative distance between the vehicle 10 and the target vehicle in the travel direction of the vehicle 10, and the current position of the vehicle 10. Based on these pieces of information, the determination unit 33 estimates the speed values of the vehicle 10 and the target vehicle and the relative distances between the vehicle 10 and the target vehicle at respective times until the target vehicle and the vehicle 10 reach the reference position. The acceleration herein also includes deceleration. More specifically, the vehicle 10 or the target vehicle decelerates when the acceleration is a negative value, and the vehicle 10 or the target vehicle accelerates when the acceleration is a positive value. In addition, the determination unit 33 predicts the positions of the vehicle 10 and the target vehicle at respective times until the target vehicle and the vehicle 10 reach the reference position. In the case where the target vehicle precedes the vehicle 10 by at least a predetermined length and is faster than the vehicle 10 at a certain time, the determination unit 33 determines that condition (i) is satisfied. The predetermined length is set, for example, at zero to dozen meters.

As the current speed of the vehicle 10, the determination unit 33 uses the latest speed measured by a vehicle speed sensor (not illustrated) of the vehicle 10. Similarly, as the current acceleration of the vehicle 10, the determination unit 33 uses the latest acceleration measured by an acceleration sensor (not illustrated) of the vehicle. The determination unit 33 estimates the speed values of the vehicle 10 at respective times, which are assumed to vary by uniformly accelerated motion, and predicts the positions of the vehicle 10 at respective times. Similarly, the determination unit 33 estimates the speed values of the target vehicle at respective times, which are assumed to vary by uniformly accelerated motion, and predicts the positions of the target vehicle at respective times. The determination unit 33 estimates the current speed of the target vehicle by estimating the positions of the target vehicle at the times of generation of those images or ranging signals obtained in the most recent certain period from which the target vehicle is detected. The bottom position of a target vehicle in an image corresponds one-to-one to the direction viewed from the camera 2 to the position at which the target vehicle is in contact with the road surface. Thus the determination unit 33 can estimate the distance and direction from the vehicle 10 to the target vehicle, based on the bottom position of the region representing the target vehicle in the image and parameters of the camera 2, such as the height of the mounted position and the focal length of the camera 2. When the target vehicle is detected from a ranging signal, the determination unit 33 can estimate the distance and direction from the vehicle 10 to the target vehicle based on the direction and distance where the target vehicle is represented in the ranging signal. The determination unit 33 can estimate the positions of the target vehicle at the times of generation of the images or the ranging signals in the most recent certain period, based on the positions of the vehicle 10 and the directions and distances viewed from the vehicle 10 to the target vehicle at the times of generation of the images or the ranging signals. The determination unit 33 estimates the current speed of the target vehicle by approximating the changes in the estimated positions of the target vehicle at the times of generation of the images or the ranging signals in the most recent certain period on the assumption that the target vehicle moves at a uniform acceleration. The determination unit 33 determines the acceleration obtained by the approximation as the acceleration of the target vehicle. When the target vehicle merges with the traffic on the host vehicle lane, the speed of the target vehicle is assumed to be substantially equal to that of the vehicle 10. Thus the determination unit 33 may determine the acceleration of the target vehicle on the assumption that the speed of the target vehicle at the reference position is equal to that of the vehicle 10 at this time and that the target vehicle moves at a uniform acceleration. In addition, the determination unit 33 determines the relative distance between the target vehicle and the vehicle 10 in the travel direction of the vehicle 10, based on the direction and distance to the target vehicle estimated on the basis of the latest image or ranging signal from which the target vehicle is detected. Further, the determination unit 33 uses the position of the vehicle 10 indicated by the latest positioning information obtained by the GPS receiver 3 as the current position of the vehicle 10. Alternatively, the determination unit 33 may determine the current position of the vehicle 10, based on comparison of an image with a high-precision map, as described in relation to the merging section detection unit 31. Alternatively, when the current position of the vehicle 10 is determined by the merging section detection unit 31, the determination unit 33 may obtain the current position of the vehicle 10 from the merging section detection unit 31.

In the case where the vehicle 10 precedes the target vehicle and the estimated speed of the vehicle 10 is greater than that of the target vehicle at a predicted time when the target vehicle or the vehicle 10 reaches the reference position, the determination unit 33 determines that condition (ii) is satisfied.

When multiple other vehicles traveling in the merging section or the predetermined section are detected in an image, the determination unit 33 applies a tracking process, such as the KLT method, to vehicle regions representing the detected vehicles in time-series images obtained by the camera 2. In this way, the determination unit 33 tracks each detected vehicle to associate vehicle regions representing the same detected vehicle in the time-series images with each other. To this end, the determination unit 33 applies, for example, a filter for extracting feature points, such as SIFT or Harris operator, to a vehicle region of interest in an image of interest, thereby extracting feature points from the vehicle region. The determination unit 33 then identifies those points in the vehicle regions in the images obtained earlier or later than the image of interest which correspond to the feature points in accordance with the applied tracking technique, thereby calculating optical flow. Alternatively, the determination unit 33 may apply another tracking technique applied for tracking a moving object detected from an image to the vehicle regions in the time-series images, thereby associating the vehicle regions representing the same detected vehicle with each other. When multiple other vehicles are detected from a ranging signal, the determination unit 33 may also track each detected vehicle by applying a similar tracking process. For each detected vehicle traveling in the merging section, the determination unit 33 determines whether conditions (i) or (ii) above is satisfied to determine whether to yield right-of-way to the detected vehicle. When determining not to yield to one of the detected vehicles, the determination unit 33 also determines not to yield to the other vehicles following the one of the detected vehicles.

The determination unit 33 notifies the vehicle control unit 34 of the predicted positions and the estimated speed values at respective times of the rearmost of the detected vehicles that are traveling in the merging section or the predetermined section and to which the determination unit 33 has determined to yield right-of-way (first vehicle). The determination unit 33 further notifies the vehicle control unit 34 of the predicted positions and the estimated speed values at respective times of a second vehicle following the first vehicle among the detected vehicles traveling in the merging section or the predetermined section. In the case where the first vehicle is not detected and where there is another vehicle satisfying neither condition (i) nor (ii) above, the determination unit 33 further notifies the vehicle control unit 34 that such a vehicle exists.

The vehicle control unit 34 controls acceleration or deceleration of the vehicle 10. In the present embodiment, the vehicle control unit 34 sets target acceleration or deceleration so as to make space where the first vehicle to which right-of-way is yielded will enter the host vehicle lane ahead of the vehicle 10. In addition, the vehicle control unit 34 sets the target acceleration or deceleration so that the rear end of the vehicle 10 is ahead of the front end of the second vehicle following the first vehicle. In the following, acceleration and deceleration will be collectively referred to as acceleration, similarly to the acceleration in the description of the determination unit 33.

Specifically, the vehicle control unit 34 refers to the remaining distance from the current position of the vehicle 10 to the reference position, the speed of the vehicle 10, and the predicted positions of the first vehicle at respective times, thereby determining the upper limit of the target acceleration of the vehicle 10 so as to make space where the first vehicle can enter ahead of the vehicle 10 before the first vehicle reaches the reference position. In addition, the vehicle control unit 34 refers to the remaining distance from the current position of the vehicle 10 to the reference position, the speed of the vehicle 10, and the predicted positions of the second vehicle at respective times, thereby determining the lower limit of the target acceleration of the vehicle 10 such that the rear end of the vehicle 10 gets ahead of the front end of the second vehicle before the first vehicle reaches the reference position. When the absolute value of the upper limit of the target acceleration exceeds a predetermined limit value, the vehicle control unit 34 may set the upper limit so that the absolute value of the upper limit is not greater than the predetermined limit value. Similarly, when the absolute value of the lower limit of the target acceleration exceeds a predetermined limit value, the vehicle control unit 34 may set the lower limit so that the absolute value of the lower limit is not greater than the predetermined limit value. The vehicle control unit 34 then sets the target acceleration of the vehicle 10 below the upper limit and above the lower limit. More specifically, the vehicle control unit 34 may set the target acceleration of the vehicle 10 so that the space between the rear end of the first vehicle and the front end of the vehicle 10 (i.e., the space between the first vehicle and the host vehicle) becomes smaller than the space between the front end of the second vehicle and the rear end of the vehicle 10 (i.e., the space between the host vehicle and the second vehicle) before the first vehicle reaches the reference position. Alternatively, the vehicle control unit 34 may set the target acceleration of the vehicle 10 so that the space between the rear end of the first vehicle and the front end of the vehicle 10 becomes equal to the space between the front end of the second vehicle and the rear end of the vehicle 10 before the first vehicle reaches the reference position.

When notified by the determination unit 33 that the first vehicle is not detected and there is another vehicle satisfying neither condition (i) nor (ii) above, the vehicle control unit 34 controls acceleration of the vehicle 10 so that the other vehicle can decide the position of merging on its own initiative. For example, the vehicle control unit 34 sets the target acceleration of the vehicle 10 so as to keep the distance between the vehicle 10 and a vehicle ahead above a predetermined distance and to keep the speed of the vehicle 10 as uniform as possible below a set vehicle speed. Thus, when the vehicle ahead decelerates and the distance between the vehicle ahead and the vehicle 10 is about to fall below the predetermined distance, the vehicle control unit 34 sets the target acceleration so as to decelerate the vehicle 10. Conversely, when the vehicle ahead accelerates and the distance between the vehicle ahead and the vehicle 10 increases, the vehicle control unit 34 sets the target acceleration so as to keep the speed of the vehicle 10 constant below a set vehicle speed.

The vehicle control unit 34 sets the degree of accelerator opening so that the actual acceleration of the vehicle 10 is equal to the target acceleration. The vehicle control unit 34 then determines the amount of fuel injection according to the set degree of accelerator opening, and outputs a control signal depending on the amount of fuel injection to a fuel injector of an engine of the vehicle 10. Alternatively, the vehicle control unit 34 determines electric power to be supplied to a motor according to the set degree of accelerator opening, and controls a driving circuit of the motor so that the determined electric power is supplied to the motor. In addition, the vehicle control unit 34 sets the amount of braking as necessary, and outputs a control signal depending on the set amount of braking to the brake of the vehicle 10.

Figure 4A:
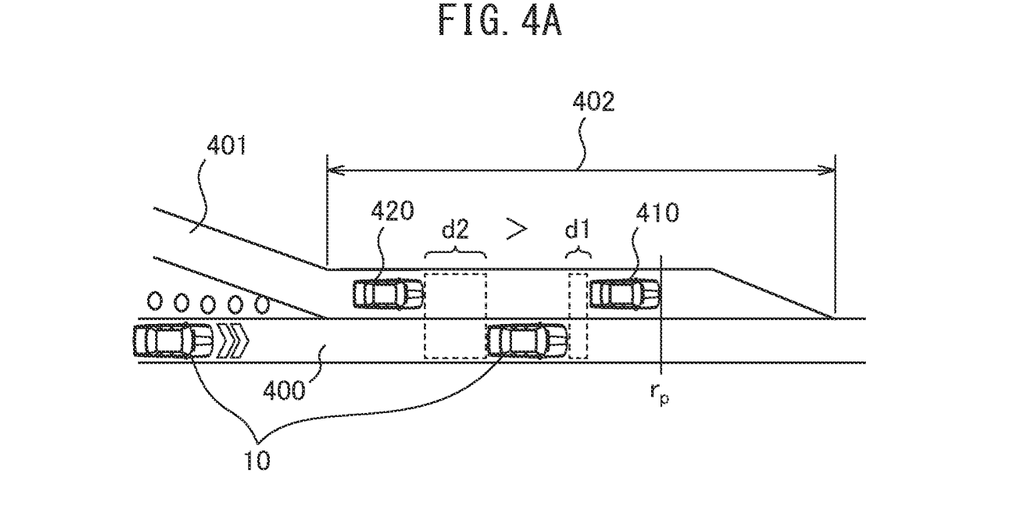
FIG. 4A is a schematic diagram for explaining the vehicle control process according to the embodiment.
Figure 4B:
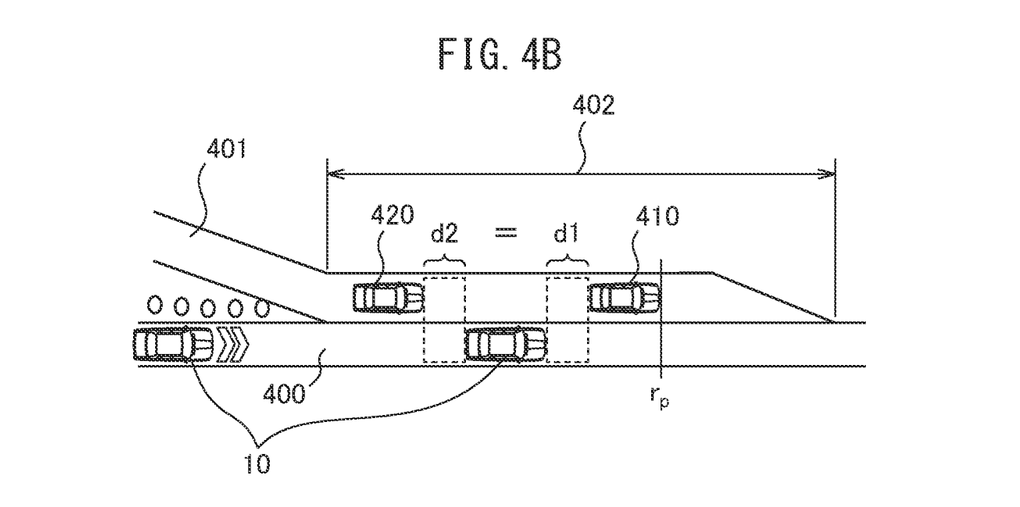
FIG. 4B is a schematic diagram for explaining the vehicle control process according to the embodiment.

FIGS. 4A and 4B are schematic diagrams for explaining the vehicle control process according to the present embodiment. In both of FIGS. 4A and 4B, a first vehicle 410 and a second vehicle 420 following the first vehicle 410 are traveling in a merging section 402 where an adjacent lane 401 merges into a host vehicle lane 400. In this example, it is determined that the first vehicle 410 is allowed to precede the vehicle 10, and that the second vehicle 420 is not allowed to precede the vehicle 10.

In the example illustrated in FIG. 4A, the target acceleration of the vehicle 10 is set so that the space d1 between the front end of the vehicle 10 and the rear end of the first vehicle 410 becomes smaller than the space d2 between the rear end of the vehicle 10 and the front end of the second vehicle 420 before the first vehicle 410 reaches a reference position rp. The space d1 may be set constant regardless of the space between the first vehicle 410 and the second vehicle 420.

In the example illustrated in FIG. 4B, the target acceleration of the vehicle 10 is set so that the space d1 between the front end of the vehicle 10 and the rear end of the first vehicle 410 becomes equal to the space d2 between the rear end of the vehicle 10 and the front end of the second vehicle 420 before the first vehicle 410 reaches a reference position rp. In both examples illustrated in FIGS. 4A and 4B, the second vehicle 420 cannot get ahead of the vehicle 10, which prevents making the driver of the second vehicle 420 mistakenly believe that right-of-way is yielded. In addition, since the vehicle 10 is ahead of the front end of the second vehicle 420, the vehicle 10 will not obstruct a lane change of the second vehicle 420 to the host vehicle lane 400.

Figure 5:
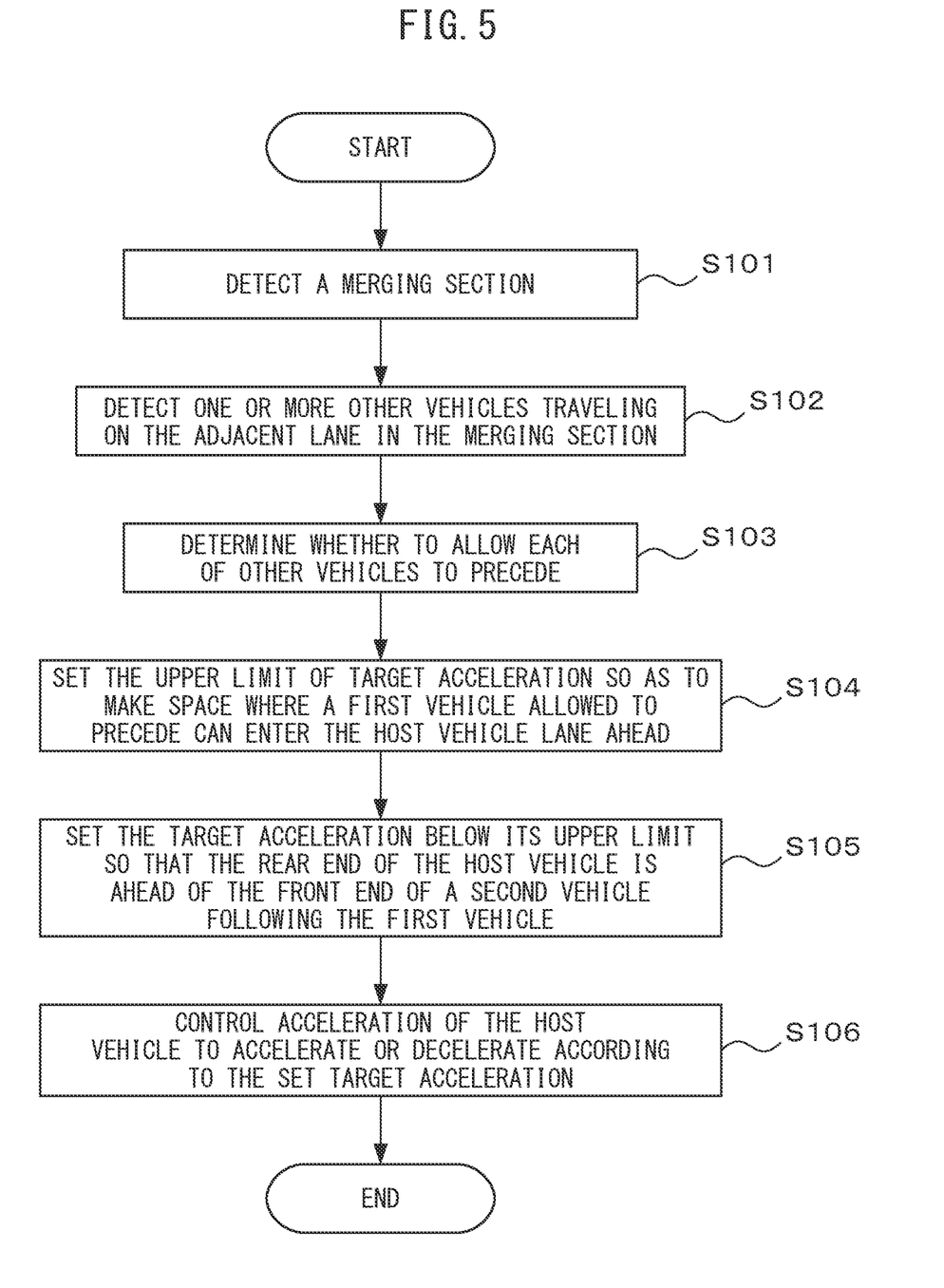
FIG. 5 is an operation flowchart of the vehicle control process.

FIG. 5 is an operation flowchart of the vehicle control process executed by the processor 23. The processor 23 executes the vehicle control process in accordance with the operation flowchart described below at predetermined intervals.

The merging section detection unit 31 of the processor 23 detects a merging section in which an adjacent lane merges into a host vehicle lane, ahead of the vehicle 10 along the travel direction of the vehicle 10 (step S101). The vehicle detection unit 32 of the processor 23 detects one or more other vehicles traveling on the lane adjacent to the host vehicle lane in the merging section or a predetermined section nearer to the host vehicle than the merging section (step S102).

For each of the one or more detected vehicles, the determination unit 33 of the processor 23 determines whether to allow the detected vehicle to precede the vehicle 10 at a lane change of the detected vehicle to the host vehicle lane in the merging section (step S103).

The vehicle control unit 34 of the processor 23 sets the upper limit of target acceleration of the vehicle 10 so as to make space where a first vehicle that is the rearmost of the detected vehicles allowed to precede can enter the host vehicle lane ahead of the vehicle 10 (step S104). The vehicle control unit 34 sets the target acceleration of the vehicle 10 below the upper limit of the target acceleration so that the rear end of the vehicle 10 is ahead of the front end of a second vehicle following the first vehicle (step S105). The vehicle control unit 34 controls acceleration of the vehicle 10 so that the vehicle 10 accelerates or decelerates according to the set target acceleration (step S106). The processor 23 then terminates the vehicle control process.

As has been described above, the vehicle controller controls acceleration or deceleration of the host vehicle so that a rear end of the host vehicle is ahead of a front end of a second vehicle following a first vehicle allowed to precede the host vehicle among other vehicles traveling in a merging section. In this way, the vehicle controller can appropriately adjust the positional relationship between the host vehicle and another vehicle traveling on an adjacent lane merging with a lane being traveled by the host vehicle. As a result, the vehicle controller can prevent obstructing a lane change to the host vehicle lane of another vehicle traveling in the merging section to which the host vehicle does not intend to yield right-of-way, and prevent making the driver of the former vehicle mistakenly believe that right-of-way is yielded.

According to a modified example, the vehicle control unit 34 may adjust the positional relationship between the first and second vehicles and the vehicle 10, depending on the space between the first and second vehicles. For example, the vehicle control unit 34 may set the target acceleration, depending on the space between the first and second vehicles, so that the ratio of the space between the rear end of the vehicle 10 and the front end of the second vehicle to the space between the front end of the vehicle 10 and the rear end of the first vehicle becomes constant before the first vehicle reaches a reference position. Specifically, in some embodiments, the vehicle control unit 34 sets the ratio so that the space between the rear end of the vehicle 10 and the front end of the second vehicle is larger than the space between the front end of the vehicle 10 and the rear end of the first vehicle. The vehicle control unit 34 determines the space between the first and second vehicles, based on the predicted positions of the first and second vehicles at the time when it is determined by the determination unit 33 that the first vehicle is allowed to precede the vehicle 10. By setting the target acceleration in this way, the vehicle control unit 34 can adjust the relative position of the vehicle 10, depending on the space between the first and second vehicles, so as not to obstruct a lane change of the second vehicle to the host vehicle lane while maintaining space where the first vehicle can enter.

When the merging section is congested, the space between the first and second vehicles may become smaller than the full length of the vehicle 10. In such a case, provision of space where the first vehicle can enter the host vehicle lane ahead of the vehicle 10 may result in the front end of the second vehicle being ahead of the rear end of the vehicle 10. Thus, when the space between the first and second vehicles is smaller than the full length of the vehicle 10 in the above-described embodiment or modified example, the vehicle control unit 34 may set the target acceleration so that the front end of the vehicle 10 is between the rear end of the first vehicle and the front end of the second vehicle. In this case also, the vehicle controller can prevent making the driver of the second vehicle mistakenly believe that right-of-way is yielded. The vehicle control unit 34 can determine the space between the first and second vehicles, based on the predicted positions of the first and second vehicles at respective times.

The computer program for achieving the functions of the processor 23 of the ECU 5 according to the embodiment or modified examples may be provided in a form recorded on a computer-readable portable storage medium, such as a semiconductor memory, a magnetic medium, or an optical medium.

As described above, those skilled in the art may make various modifications according to embodiments within the scope of the present disclosure.

What is claimed is:

1. A vehicle controller comprising:
a processor configured to:
detect, ahead of a host vehicle, a merging section in which an adjacent lane adjacent to a host vehicle lane being traveled by the host vehicle merges into the host vehicle lane,
detect one or more other vehicles traveling on the adjacent lane,
determine whether to allow at least one of the detected vehicles to precede the host vehicle at a lane change of the one of the detected vehicles to the host vehicle lane in the merging section,
control acceleration or deceleration of the host vehicle so that a rear end of the host vehicle is ahead of a front end of a second vehicle following a first vehicle allowed to precede the host vehicle, the first and second vehicles being among the detected vehicles, and
when a space between the first vehicle and the second vehicle is smaller than a full length of the host vehicle, set a target acceleration of the host vehicle so that the front end of the host vehicle is between a rear end of the first vehicle and the front end of the second vehicle.

2. The vehicle controller according to claim 1, wherein the processor controls acceleration or deceleration of the host vehicle so that space between the host vehicle and the first vehicle is smaller than space between the host vehicle and the second vehicle, when the space between the first vehicle and the second vehicle is larger than the full length of the host vehicle.

3. The vehicle controller according to claim 1, wherein the processor controls acceleration or deceleration of the host vehicle, depending on space between the first vehicle and the second vehicle, so that a ratio of space between the host vehicle and the first vehicle to space between the host vehicle and the second vehicle is constant, when the space between the first vehicle and the second vehicle is larger than the full length of the host vehicle.

4. A method for vehicle control, comprising:
  detecting, ahead of a host vehicle, a merging section in which an adjacent lane adjacent to a host vehicle lane being traveled by the host vehicle merges into the host vehicle lane;
  detecting one or more other vehicles traveling on the adjacent lane;
  determining whether to allow at least one of the detected vehicles to precede the host vehicle at a lane change of the one of the detected vehicles to the host vehicle lane in the merging section;
  controlling acceleration or deceleration of the host vehicle so that a rear end of the host vehicle is ahead of a front end of a second vehicle following a first vehicle allowed to precede the host vehicle, the first and second vehicles being among the detected vehicles, and
  when a space between the first vehicle and the second vehicle is smaller than a full length of the host vehicle, setting a target acceleration of the host vehicle so that the front end of the host vehicle is between a rear end of the first vehicle and the front end of the second vehicle.

5. A non-transitory recording medium that stores a computer program for vehicle control, the computer program causing a processor mounted on a host vehicle to execute a process comprising:
  detecting, ahead of the host vehicle, a merging section in which an adjacent lane adjacent to a host vehicle lane being traveled by the host vehicle merges into the host vehicle lane;
  detecting one or more other vehicles traveling on the adjacent lane;
  determining whether to allow at least one of the detected vehicles to precede the host vehicle at a lane change of the one of the detected vehicles to the host vehicle lane in the merging section;
  controlling acceleration or deceleration of the host vehicle so that a rear end of the host vehicle is ahead of a front end of a second vehicle following a first vehicle allowed to precede the host vehicle, the first and second vehicles being among the detected vehicles, and
  when a space between the first vehicle and the second vehicle is smaller than a full length of the host vehicle, setting a target acceleration of the host vehicle so that the front end of the host vehicle is between a rear end of the first vehicle and the front end of the second vehicle.

* * * * *